United States Patent [19]

Upton, Jr.

[11] 3,918,511

[45] Nov. 11, 1975

[54] AWNING AND BRACKETS AND EXTRUSION METHOD THEREFOR

[75] Inventor: Albert E. Upton, Jr., Wichita, Kans.

[73] Assignee: The Scott & Fetzer Company, Lakewood, Ohio

[22] Filed: Mar. 7, 1974

[21] Appl. No.: 448,953

Related U.S. Application Data

[62] Division of Ser. No. 344,903, March 26, 1973, Pat. No. 3,866,874.

[52] U.S. Cl. .................. 160/67; 160/71; 135/5 AT
[51] Int. Cl.$^2$ .......................................... E04F 10/06
[58] Field of Search ............................. 160/45–83, 160/300–305, 392; 135/5 AT; 248/225, 251, 273

[56] References Cited
UNITED STATES PATENTS

| | | | |
|---|---|---|---|
| 189,781 | 4/1877 | Phillips | 160/303 |
| 2,511,294 | 6/1950 | Peterson | 160/65 |
| 3,779,302 | 12/1973 | Akers et al. | 160/68 |

Primary Examiner—Philip C. Kannan
Attorney, Agent, or Firm—Burton, Crandell & Polumbus

[57] ABSTRACT

This invention is an awning structure having an awning sheet securable on one edge to a surface, an awning sheet roller, a support arm for the roller, a first bracket securable to the surface and attached to the lower end of the supporting arm in pivotal relation therewith, a brace pivotally attached to a second bracket securable on the supporting surface, the brace being contactable with a mid-portion of the supporting arm when in an extended position. The first bracket receives and holds in juxtapositional relation the brace and the support arm when the awning structure is in a collapsed storage position. The first bracket and the second bracket are formed by a new extrusion method and have a notch-like aperture therethrough for mounting a pin.

17 Claims, 16 Drawing Figures

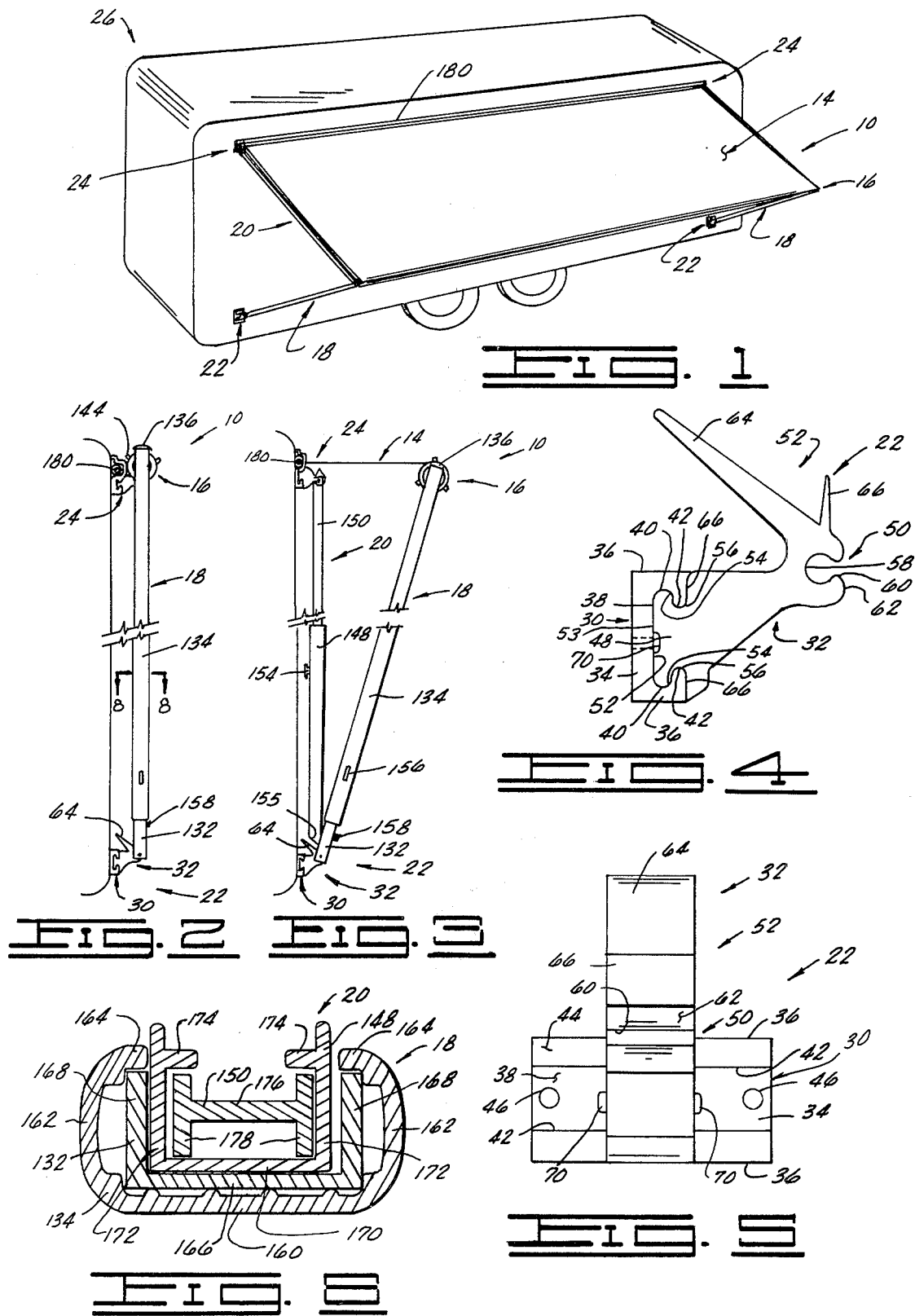

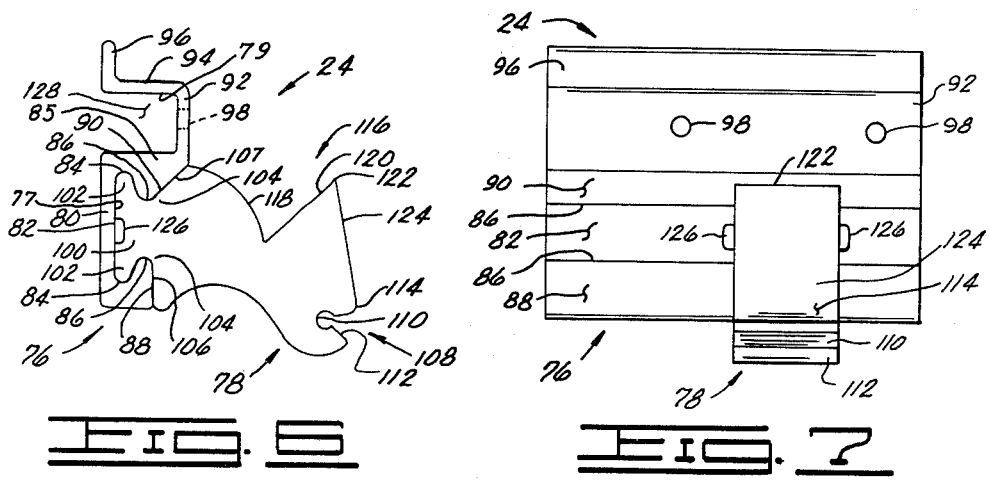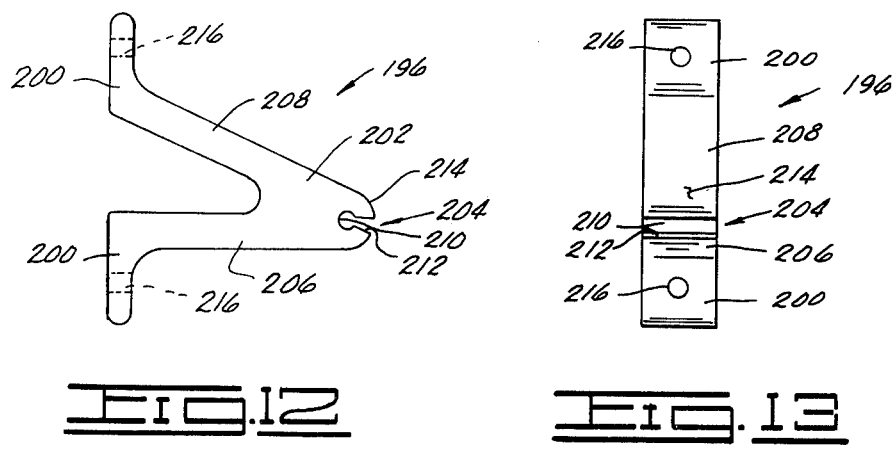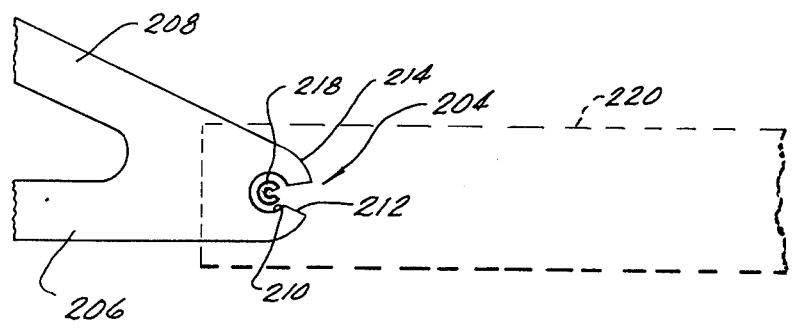

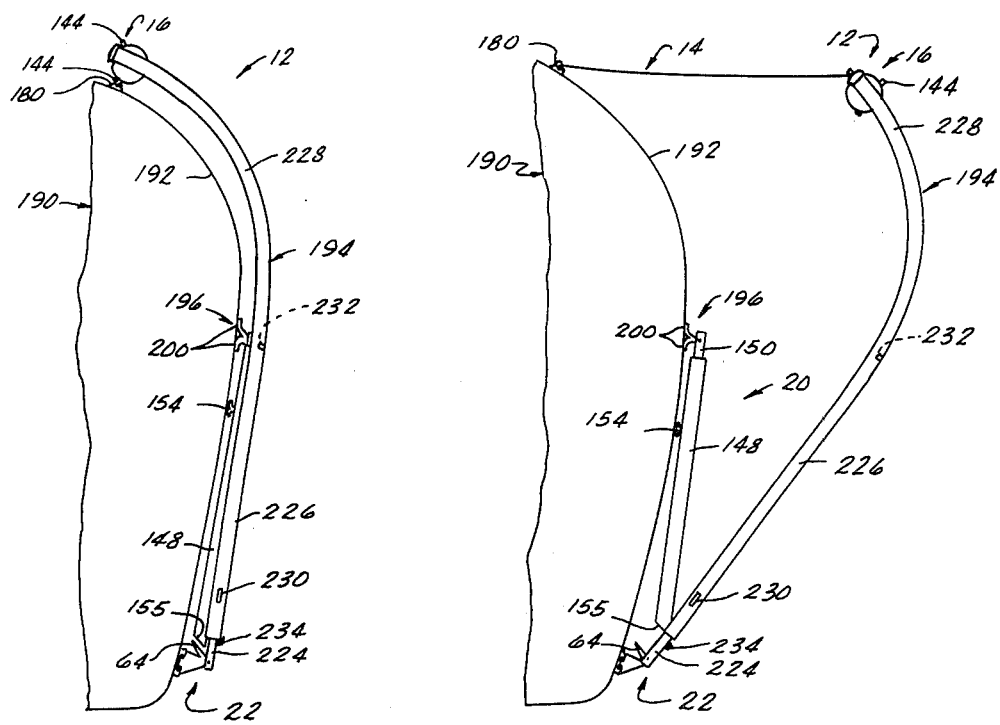
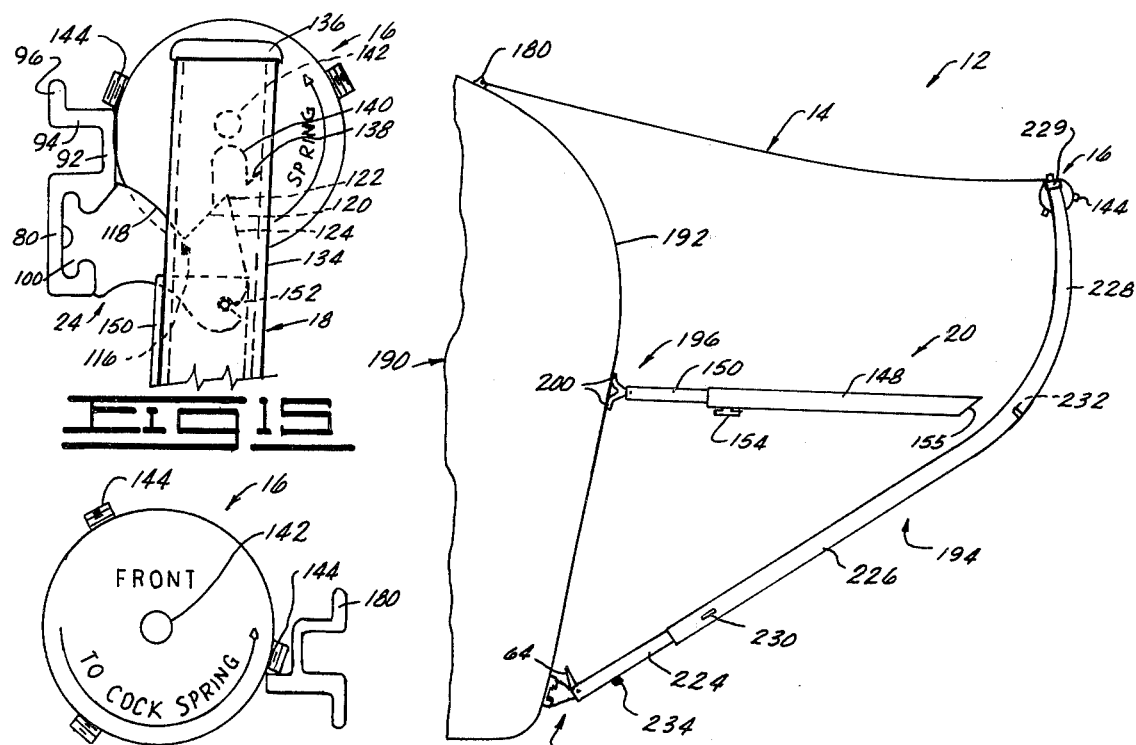

AWNING AND BRACKETS AND EXTRUSION METHOD THEREFOR

This is a division of application Ser. No. 344,903, filed Mar. 26, 1973, now U.S. Pat. No. 3,866,874.

BACKGROUND OF THE INVENTION

Many types of awning structures known in the prior art which are mountable on a supporting surface can be extended for use then retracted to a storage position alongside the supporting surface. Of these prior art awning structures many of them are adapted for use with travel trailers or mobile homes or other similar vehicles which are exposed to on-the-road wind conditions. These awning structures which are devised for use with travel trailers and the like must either be completely disassembled and removed from the exterior structure of the trailer for storage inside the trailer or in a special compartment. Another type of awning structure usable with this type of vehicle has a compartment mounted on the upper portion of the vehicle from which the awning is pulled or unrolled when it is to be used. This device houses the awning sheet and the disconnectable awning supporting structure. None of the prior art devices have structures which enable the awning support arms, braces and so forth to be left in the mounted condition on the exterior of the vehicle when in storage. In regard to the specific structure of the brackets and related elements which accompany these prior art devices, they are generally cast articles or machined structures. The structure components of the prior art arms and braces are generally tubing or pipes. Assembly of these prior art awning structures is quite time consuming when it is desired to set up the awning as each of the arms and related elements must be individually joined with its cooperating elements then later taken apart when it is desired to put the awning away. The structure of the prior art devices is rather expensive due to the structure of the brackets and other elements which must be cast and then hand or machine finished to a proper fit.

SUMMARY OF THE INVENTION

In one preferred specific embodiment of the present invention, an in awning structure, includes an awning sheet, an awning roller, a roller support arm, a first bracket securable to a supporting surface and pivotally mounting the lower end of the roller support arm, and a brace member pivotally secured on its upper end to a second bracket which is also securable to the supporting surface. The brace member has the free end thereof contactable with the support arm when the awning structure is in the extended position. The first bracket is constructed to receive and hold in juxtapositional relation the brace member and the support arm when the awning structure is in a collapsed storaged position with the free end of the brace member in contact with the first bracket and the brace member positioned substantially within a portion of the supporting arm. The second bracket member has a notched portion to receive and hold in locked relation the upper end of the support arm. The awning structure of this embodiment is specifically adapted for use on planar supporting surfaces such as on travel trailers with rectangular box-like bodies or a planar surface. The brackets are constructed by an extrusion method and each have a notch-like aperture therethrough constructed and adapted to receive and hold a pin or the like for the pivotal mounting of the support arm and the brace member.

In another of the present invention embodiment, an awning structure includes the same general structural elements as the first described embodiment and is adapted for use with travel trailers having curved sides. The awning support arm is curved to match the curvature of the supporting surface and the second bracket is attachable to the supporting surface to support the brace so that it contacts a mid-point of the support arm when in the extended position and so that it can be substantially enclosed in juxtapositional relation to the support arm when in the storage position. The first bracket is the same as for the first described embodiment. The brackets are made by an extrusion method and have a notch-like aperture therethrough to receive and hold a pin or the like for mounting of the braces and support arms.

OBJECTS OF THE INVENTION

One object of this invention is to provide an awning structure and brackets and method of making awning brackets overcoming the before mentioned disadvantages of the prior art devices.

One other object of this invention is to provide awning structures having a rollable awning sheet supported by an arm and a brace which are each mounted with a supporting surface by brackets with the arm and the brace being movable between an extended position and a collapsed storage position wherein the arm and the brace are in a juxtapositional relation.

Still, another object of this invention is to provide an awning structure for use with a travel trailer or the like which has brackets to attach an awning roller support arm and a brace to the side of the trailer and which will allow the awning to be retracted into a collapsed storaged position and retained therein so as to not be affected by wind forces when pulling the travel trailer on the road.

Still, another object of this invention is to provide an awning structure which has awning support arm brackets therefor constructed by an extrusion method wherein the bracket produced has a notch-like aperture therethrough to receive and hold a pin or the like to pivotally mount of members thereto.

Yet, another object of this invention is to provide an awning structure which can be secured to the side of a travel trailer or other structure having a planar side surface.

Yet, another object of this invention is to provide an awning structure which can be secured to a side of a travel trailer or other structures which has a curved side surface.

One further object of this invention is to provide brackets for an awning structure which are extruded and have a notch-like aperture therethrough to receive a pin or the like for mounting of support arms or the like.

One further object of this invention is to provide a method of making brackets for mounting support arms such as for awning structures, the method producing brackets having a longitudinal keyway therethrough for receiving a pin or the like for mounting the support arms.

Various other objects, advantages of the invention will become apparent to those skilled in the art from the following discussion, taken in conjunction with the accompanying drawings.

BRIEF DESCRIPTION OF THE DRAWINGS

FIG. 1 is a perspective view of a travel trailer having flat sides with the awning structure attached thereto and shown in the extended position;

FIG. 2 is a shortened end elevation view of the awning structure for the flat sided type trailers shown in the collapsed storage position;

FIG. 3 is a shortened end elevation view of the awning structure shown in FIG. 2 having the support arm in a partially extended position;

FIG. 4 is a side elevation view of the first bracket or the bracket for mounting the lower end of the support arm;

FIG. 5 is an elevation view of the awning first bracket shown in FIG. 4 taken from the normally outer side thereof;

FIG. 6 is an end elevation view of the second bracket or the bracket for the brace as shown in FIGS. 1, 2 and 3;

FIG. 7 is an elevation view of the second bracket shown in FIGS. 6 taken from the normally outer side thereof;

FIG. 8 is a cross-sectional view of the support arm and bracket taken on line 8—8 of FIG. 2;

FIG. 9 is an end elevation view of a portion of a travel trailer having a curved exterior with the awning structure mounted thereon and shown in the collapsed storaged position;

FIG. 10 is an end elevation view of the travel trailer and awning structure shown in FIG. 9, having the support arm and brace in a partially extended position;

FIG. 11 is an end elevation view of the travel trailer and awning structure shown in FIGS. 9 and 10 with the awning structure shown in the extended position, and the brace being slightly removed from the support arm for clarity;

FIG. 12 is an elevation view of the second bracket or brace supporting bracket for the awning structure as shown in FIG. 9;

FIG. 13 is an elevation view of the bracket shown in FIG. 12, taken from the normally outer side thereof;

FIG. 14 is an enlarged end elevation view of the outer end portion of the bracket shown in FIG. 12 having a portion of the brace member attached thereto by a pin with the brace member shown in dashed lines for clarity;

FIG. 15 is an enlarged end elevation view of the second bracket, awning sheet roller upper end of the brace and support arm for the awning structure as shown in FIG. 2; and FIG. 16 is an end elevation view of the awning support roller and awning rail for the awning structure as shown in FIG. 9.

DESCRIPTION OF THE PREFERRED EMBODIMENTS

The following is a discussion and description of preferred specific embodiments of the awnings, brackets and extrusion method therefor of this invention, such being made with reference to the drawings whereupon the same reference numerals were used to indicate the same or similar parts and/or structure. It is to be understood that such discussion and description is not to unduly limit the scope of the invention.

The awning structure of this invention is shown in two embodiments thereof, with one embodiment thereof, shown in detail in FIGS. 1, 2 and 3 and generally indicated at 10; and the other embodiment thereof, shown in detail in FIG. 9, 10 and 11 and generally indicated at 12. The awning structure in the first described embodiment, which is generally indicated at 10 is adapted for a specific use with travel trailers or other structures having a flat side for mounting of the awning structure. The second described embodiment which is generally indicated at 12 is adapted to have a specific use of being mountable with travel trailers or other structures having a rounded exterior or a curved side on which the awning structure can be mounted. Certain portions of the two embodiments of the awning structure of this invention are the same and will be so noted hereinafter.

Referring to the drawings in detail and in particular in FIGS. 1–7, and 15, the first embodiment of the awning structure and brackets therefor of this invention is shown with the awning structure in complete form mounted on the side of a travel trailer and the brackets therefor are shown individually in FIGS. 4, 5, 6 and 7. The awning structure 10 includes an awning sheet 14 attached to an awning roller 16 and to the trailer, an awning support arm 18 attached to the roller 16, a brace 20, a first bracket 22 pivotally mounting the lower end of the support arm 18, and a second bracket 22 pivotally mounting the upper end of the brace 20. FIG. 1 shows the awning structure 10 in the extended position as it would appear when mounted on a travel trailer such as the one shown and generally indicated at 26. FIG. 2 shows a shortened end view of the awning structure 10 in the retracted or collapsed storage position wherein the awning support arm 18 is in locked relation with the second bracket 24 and the brace 20 is confined in juxtapositional relation within the support arm 18.

FIGS. 4 and 5 show in detail the structure of the first bracket or lower bracket 22. The first bracket includes a mount member, indicated at 30, which has attached thereto an extended or male bracket member, indicated at 32. The mount member 30 is a channel-like female member with a longitudinal groove therethrough having a flat back portion 34 with side portions 36 extending perpendicularly from the edges thereof. The interior of the mount or female bracket member 34 has a flat inner surface 38 on the inside of the back portion 34 with rounded corners 40 at the edges thereof and oppositely contoured other corners portions 42 adjacent to the open side surface of the member. The distance between the outer most corners 42 of the longitudinal groove is less than the distance between the innermost corners 40 as shown in FIG. 4. The open side of the mount member 30 has planar surfaces 44 extending from the corners 42 to the side portions 36. The particular shape of the female bracket member 30 attaches to a oppositely shaped portion of the male bracket member 32. A pair of apertures 46 in the opposite end portions of the female bracket member 30 are used to secure it to the supporting surface surface or the side of a travel trailer or whatever. The extended member or male bracket member 32 of the first bracket 22 has a male portion 48 on a first side thereof to engage with the groove of the mount member 30, a notch-like aperture 50 on a second or opposite side thereof, and a notch portion 52 on the normally upward side thereof. The male portion 48 of the male bracket member engages with the groove in the female bracket member 30 as shown. The male portion 48 has a flat surface 53 and oppositely turned corner portions 54 and 56 to match with the surface curvature of the interior of the mount member 30. The notch-like aperture 50 is a keyway like aperture formed in the second side portion of the extended member 22 and as shown in FIG. 4 it has a large generally circular interior portion 58 and a smaller outer portion 60 connecting the interior portion 58 with the member's outer surface 62. The large generally circular interior portion 58 is well within the interior of the member and in use is adapted to receive and hold a pin, bolt, or similar article for the pivotal mounting of the support arm 18. On the upper portion of the extended member 32 is a notch, generally indicated at 52, formed between an upwardly inclined portion 64 and an upright portion 66. In use the notch 52 receives and holds in storage position the lower end of the brace 20.

In the production of the second bracket 22, both the mount member 30 and the extended member 32 are continually extruded by the new bracket producing method of my invention in an elongated form then cut to the appropriate and desired length before being joined together. The female bracket member 30 is extruded through an extrusion die which forms along extrusion having the cross-sectional shape shown in FIG. 4 and described above. The die has a shape corresponding to the shape of the extrusion (FIG. 4). After extrusion, the mount or female bracket member 30 is cut to the desired length and the holes 46 punched therethrough. The extended or male bracket member 32 is extruded through a corresponding die in the shape as shown in FIG. 4 and as described above. As the member is extruded the notch-like aperture 50 is formed by a boss-like projection in the wall of the extrusion die and the notch defining portions 64 and 66 are formed by recesses in the die wall. After extrusion, the piece forming the extended member 32 is cut to the size needed then joined with the female bracket member 30. The male portion of the extended or male bracket member 32 is sizeed so as to fit inside the groove of the female bracket or mount member 30 in an interference fit so the extended member 32 when engaged with the mount member 30 will retain its position therein. Once the male bracket member 32 is joined with the female bracket member 30 the flat surface 34 of the female bracket member 30 can be swedged to raise the bump portions 70 on opposite sides of the male bracket member and thereby lock the position of the members which prevents sliding of the extended or male bracket member 32 within the mount or female bracket member 30.

The notch-like aperture 50 through the bracket outer extended member 32 is an important feature of the bracket 22 and of the other similar brackets of this invention. A similar notch-like aperture is included in the other brackets of this invention. The bracket extrusion by virtue of the particular notch-like aperture 50 allows the quick and easy mounting of another member to the bracket without the necessity of drilling or punching a hole through the bracket once it is assembled. The preformed notch-like aperture is a feature of this invention which provides a considerable savings in production costs and assembly time. The brackets with the notch-like apertures are designed to compensate for the structural weakness opening in the outer portion of the bracket. The particular size of the notch-like aperture of course will depend upon the size of the pin, bolt or whatever is to be passed through the bracket. Although the extrusion of material for making brackets is shown and described herein in conjunction with brackets for awnings; it is to be understood that this method of extruding and making brackets can be applied to other fields wherein similar extruded structure can be used.

FIGS. 6 and 7 show in detail the structure of the second bracket 24, such includes a mount member 76 and an attached extended member 78. The mount member is a female bracket member and has a groove 77 open on one side thereof and an oppositely turned channel portion with another groove 79 adjacent thereto. The extended member is a male bracket member having a male portion on one side thereof to engage with the groove 77 of the mount member 76, a notch-like aperture on the opposite side thereof and another notch on the top thereof. The mount member 76 has a flat side 80 which in use is adjacent to the supporting surface and which forms the normally rear portion of the member. The interior of the mount or female bracket member has a flat surface 82 with rounded corners 84 on the opposite ends thereof which join oppositely turned corner portions 86 on the open side of the member. The distance between the innermost corners 84 is greater than the distance between the outermost corners 86 as is shown clearly. On the outer surface of the mount member 76, a normally lower surface 88 joins the lower corner 84 and is parallel to the back side of the member. Another surface on the opposite side of the groove 77 is indicated at 90 and joins the other outer corner portion 86 and is inclined relative to the back side of the member. The rear side of the bracket member 76 has the opening of the groove 79. The groove 79 is formed in a portion of the bracket extending upward from the portion containing the groove 77. The groove 79 has a wall portion 92 which is on the normally forward side of the bracket member, one side wall formed by the normally upper side wall 85 of the portion containing the groove 77, and another side wall 94 extending rearwardly from the bottom portion 92. A flange 96 extends upward from the side 94 on the rear side of the bracket member 76. The groove 79 defines a space 128 therein which can be used to enclose an awning rail. A pair of apertures 98 are provided through the forward portion 92 for mounting of the bracket 24 on a supporting surface.

The extended member or male bracket member 78 is constructed to be slid into the groove 77 of the mount member 76 and retained therein in the position shown in FIGS. 6 and 7. The extended member 78 has a male portion on one side thereof with a flat edge surface, rounded adjacent corners 102 and oppositely turned adjacent corners 104 to match corresponding corners of the mount members. Other surfaces adjacent to the inwardly turned corners 104 are indicated at 106 and 107 to engage with the outer surfaces 88 and 90 of the mount member 76. On a second side of the extended member 78 is the notch-like aperture, indicated at 108. The notch-like aperture 108 has a circular inner portion 110 in the interior of the extended member and a narrow portion 112 opening the aperture to the outer surface 114 on the second side of the member. On the normally upper side of the extended member 78 is the notch portion indicated at 116 formed by intersecting surfaces 118 and 120. A peak is formed and indicated at 122 at the juncture of the surface 120 and another surface 124 on the second side and extending upward from the area of the notch-like aperture 108. The notch 116 and the peak 120 are used in securing the upper end of the support arm 18 with the bracket 24 as will be described hereinafter.

The second bracket 24 is constructed by the previously described extrusion method in regard to bracket 22, and is preferably constructed in the specific shapes shown in FIGS. 6 and 7. As with bracket members 30 and 32, the bracket members 76 and 78 are preferably extruded and cut from aluminum alloy. Any other suitable material can be used, for example, plastic or plastic reinforced materials. It is to be noted that the mount member 78 is considerably wider than the extended member 78 so as to provide stability in mounting. Once the mount member 76 and extended member 78 have been cut to the correct and desired sizes they are forced together in the interference fit and the mount member 76 can be swedged as indicated at 126 to lock the members together. When the members 76 and 78 are pressed together the adjacent surfaces in the male portion and groove 77 are brought into a frictional engagement. It is to be noted that the extended member 78 can be positioned anyplace in the groove portion of the mount members 76, however, in practice it has been found advantageous to position same in the off-center position as shown in FIG. 7. A pair of brackets 24 having the mount members 76 and the extended member 78 in opposite off-center positions allows the space indicated at 128 in the channeled portion of the mount member 76 to be used to receive and hold the end portion of the awning sheet retaining railing with one bracket holding each end of the awning railing. The awning sheet retaining railing is a separate member used to attach one edge of the awning sheet 14 to the side of a trailer or a supporting surface and is generally a C-shaped member to receive a bead or an enlarged edge portion of an awning sheet.

FIG. 2, 3 and 15 show in detail the structure of the awning support arm 18 and the brace 20. The awning support arm 18 is a telescopic member with interconnecting channel-like members which is mounted with the first bracket 22 and is used to support the roller 16. The support arm 18 has an inner channel member 132 adapted to pivotally be attached to the first bracket 22 and an outer channel member 134 connected to the awning roller 16 by a top plug 136. The awning roller 16 is a spring urged roller apparatus adapted to pull the awning sheet to roll therearound. The roller 16 is tensioned to have a pulling force on the awning sheet 14 at all times. FIG. 8 shows in detail the features of the interlocking slidable channel members 132 and 134. The top plug 136 fits in the upper end of the outer channel member 134 and is shown in detail in FIG. 15. The top plug 136 fits inside the outer support arm member 134 and has an inclined surface 138 on its inner surface which is shaped as shown in FIG. 15. A notch 140 is provided in the center portion of the inclined surface. The awning roller 16 has the axle thereof mounted in the top plug 136 as indicated at 142. When in the storaged position the innermost side of the inclined surface 138 engages the notch 116 of the second bracket 24 to lock the support arm 18 and roller 16 into position shown in FIGS. 2 and 15. With the awning in this position the peak 122 on the upper portion of the second bracket 24 is within the space of the notch 140 in the top plug member 136. Additionally, it is to be noted that the awning roller 16 has several lugs 144 extending therefrom which are spaced to come into contact with the upper portion of the second bracket 24 at the juncture of the portions 92 and 94 thereof to further prevent rotation of the awning roller when in the locked and collapsed storage position.

The brace 20 is constructed similarly to the support arm 18 with interlocking members as shown in detail in FIG. 8. The brace includes an outer generally U-shaped channel member 148 and an H-shaped inner member 150 with the inner member 150 being adapted to freely slide within the outer member 148. The upper end of the brace inner member 150 is connected with the extended member 78 of the upper or second bracket 24 by a pin 152 so it will pivot relative to the second bracket. The brace outer member 148 comprises the outer end portion of the brace and has an inclined surface 154 on the end thereof. When in the storaged position the inclined surface 154 of the brace outer member 148 rests on the first bracket 22 in the notch 52 thereof on the inclined portion 46 and against the upright portion 66 to secure the brace 22. When the awning structure 10 is in the extended assembled position, the inclined surface 54 rests on the inner portion of the support arm outer member 134 and against the inclined surface 138 of the top plug member 136. The brace 20 and the support arm 18 are provided with locking screws 154 and 156 respectively which are used to lock or temporarily fix the length of the members. The brace locking screw 154 is threaded through the inner H-shaped member 150 to press against the inside of the outer member 148 as shown generally in FIG. 3. The locking screw 156 on the support arm 18 attaches through an outer side of the outer member 134 and presses against the inner member 132 as shown generally in FIG. 3. When the awning structure 10 is in the storage position, as shown in FIG. 2, the locking screws 154 and 156 are used to secure the members in a rigid relation. In the storage position the brace 20 is secured, with the outer member 148 having the outer end thereof coming in contact with the first bracket 22. The support arm 18 is secured with the top part thereof held in firm connection with the second bracket 24. To prevent the support arm 18 from damaging the second bracket 24 by being forced downward a stop lug 158 is provided through the lower support arm member 132 as shown in FIG. 2 and FIG. 3. The stop lug 158 can be a bolt or the like placed through the inner member 132 in a position so the other support arm member 134 will rest thereon when in the storage position.

FIG. 8 shows in detail the preferred specific structures of the awning support arm 18 and brace 20 in the juxtapositional relation which they assume when in the storaged position. The support arm outer member 134 is a generally cross-sectionally C-chaped member having a flat outer portion 160 rounded and curved ends 162 with ends 164 on the normally inner side thereof disposed in a plane parallel to the outer surface 160. The support arm inner member 132 is in cross-section a generally U-shaped member having a flat outer surface 166 and integral sides 168 perpendicular thereto. The sides 168 of the support arm inner member 132 fit within the confines of the outer support arm member 134 and are sized so as to freely slide through it. The brace outer member 148 is also a generally cross-sectionally rectangular U-shaped member having a flat outer side 170 with parallel sides 172 perpendicular to the flat side 170 and additionally having inwardly extending ridges 174 on the normally inner portion thereof partially closing the gap between the sides 172, as shown. The brace inner member 150 is a generally cross-sectionally H-shaped member having a center portion 176 and integral parallel ends 178 perpendicular to the center portion 176. The brace inner member 150 is positioned within the brace outer member 148 and is sized so as to freely slide therein and be retained therein. It is to be noted that the brace 20 and the support arm 18 including the several members thereof are preferably constructed of extrusions in order to produce members which are uniformly shaped and economical to manufacture. The length of the several members will depend upon the specific travel trailer or other structure to which the awning structure 10 is to be used as the support arms and the braces must be sized by length accordingly.

The awning structure 10 and brackets of the embodiment of this invention are designed to be attached to a planar supporting surface such as the side of a travel trailer having a flat side surface or a mobile home or a building structure or other structures where it may be desired to install and use an awning that can be extended and retracted. In the use of the awning structure 10 and brackets attached to the upper portion of the trailer 26 or similar structure. An edge of the awning sheet 14 is secured in an awning railing 180 between the second brackets 24. The first brackets or the lower brackets 22 are mounted directly below the second brackets 24 so the support arms 18 and braces 20 will be in a vertically oriented position. The awning sheet 14 is wound on the awning roller 16 so it will be pulled to a normally retracted position by a spring in the awning roller. In the retracted storage position the support arms 18 and braces 20 are locked with the first and second brackets as shown in FIG. 2. In this locked and collapsed storaged position a travel trailer can be pulled on the road and wind will not affect the awning structure or pull it loose from the brackets. The tightly wound awning sheet 14 on the awning roller 16 in the position adjacent to the side of the trailer and the awning rail prevents billowing and puffing up of the awning sheet along the roller when being pulled on the road. To extend the awning structure 10 to the position shown in FIG. 1 the locking screws 154 and 156 are released. The awning support arms 18 are lifted from the second brackets 24 and pulled to the desired extended position by being telescoped outward and raised upward. Once the support arms 18 are in the desired position the locking screws 156 are used to prevent the length from changing. The braces 20 are extended and locked in the outer end portion of the support arm below the top plug member 136 and the locking screws 154 are tightened to prevent the length from changing. Retraction of the awning structure 10 is accomplished by reversing of the described procedure.

Another preferred embodiment of the awnings, brackets, and extrusion method therefor of this invention such is the awning structure illustrated in FIGS. 4–14 and FIG. 16. This second embodiment, (2), awning structure is generally indicated at 12 is constructed and adapted for use on travel trailers or the like having a curved surface on which the awning structure is to be mounted. FIGS. 9, 10 and 11 show a travel trailer generally indicated at 190 which has a curved outer side surface 192 on which the awning structure 12 is mounted.

Certain portions of the awning structure 12 utilizes the same elements as the first described embodiment, (1), of this invention. These elements are the lower bracket or first bracket 22, the brace 20, the awning roller 16 and the awning sheet 14 and the awning support rail 180. The similar portions of the awning structure 12 have the same reference numerals as they do in the first described embodiment for clarity.

The awning structure includes an awning support arm 194 secured on its lower end to the first bracket or lower bracket 22, and having on its upper end the awning roller 16, the brace 20 is secured by a second bracket 196 to a mid-portion of the curved side surface 192 and depends therefrom. The awning support arm 194 is curved on the upper end portion thereof to match the curvature of the surface 192. As is the case on most travel trailers such as the one shown and indicated at 190 the door thereof opens on the side thereof and has a portion extending into the curvature of the upper part of the trailer thereby making it necessary for the awning sheet 14 to be attached well above the door so it can be opened without interfering with the awning fabric. These preferred specific shapes of the awning support arm 194 and brace 120 are the same as shown and described in FIG. 8 with the first described embodiment. The awning roller 16, awning sheet 14 and awning railing 180 are also the same as previously described. The brace 20 is the same as previously described, however, such is slightly shorter in length due to its mounting at a point below the upper most part of the awning structure. The second bracket 196 is shown in detail in FIGS. 12, 13 and 14 and functions in this embodiment of the awning structure only as a support for the brace 20. The first bracket or lower bracket 22 is the same as previously described and functions similarly.

FIGS. 12, 13 and 14 show in detail the structure of the second bracket or brace attaching upper bracket 196. The second bracket 196 has a first side portion with a pair of flanges 200 extending outward therefrom for mounting the bracket on the supporting surface and an opposite side portion 202 having a notch-like aperture therethrough generally indicated at 204. The bracket as shown has a normally lower portion 206 extending generally perpendicular to flanges 200 and an inclined upper portion 208 inclined outward and downward to the notch-like aperture 204. The notch-like aperture 204 has a generally circular inner portion 210 on the interior of the brackets outer portion 202 and a narrower portion 212 connecting the inner portion 210 with the brackets outer surface 214. The inner portion 210 of the notch-like aperture 208 is adapted to receive and hold therein a pin or the like as shown in the enlarged view of the brackets end portion in FIG. 14. A pair of apertures 216 through the flanges of 200 are provided for mounting of the second bracket 196 with a supporting surface.

FIG. 14 shows an enlarged detail of the structure of the notch-like aperture of the second bracket 196. The structure shown has a shoulder pin 218 within the interior portion 210 of the aperture 204 and a portion of the brace member indicated at 220 and shown in dashed lines attached to the bracket. The brace portion 220 illustrates one manner of connecting the brace and the bracket. The general shape of the notch-like aperture 204 is the same for the second bracket 196 and the other brackets 22 and 24 of this invention. The configuration of the notch-like aperture 204 is such that a pin, as the pin 218, can be passed through the aperture in the inner portion thereof and retained to support another member, indicated by the brace portion 220, in a pivotal relation. In practice in using the new described bracket producing extrusion method of this invention, the notch-like apertures in the brackets produced for the awning structures by the described method can be sized to receive pins, bolts, or other fasteners as desired. In making the second bracket 196 as shown in the drawings, it is extruded through a die having a shape corresponding to the shape of the extrusion, (FIG. 12). Once the elongated extrusion is formed it is cut to the proper and desired width. As the notch-like aperture 204 is formed in the bracket in the extrusion process, it is not necessary to drill or punch a hole through the outer portion 202 thereof for the mounting of the brace 20 or for the mounting of any other article.

The brace 20 which attaches to the second bracket 196 is structurally the same as previously described and includes an inner member 150 pivotally attached to the notch-like aperture 204 of the second bracket 196, an outer member slideable over the inner member 150 having a locking screw 154 to fix the length of the brace and having a bevelled end portion 154 on the outer end thereof for engagement with the first bracket 22 and the awning support arm 194.

FIGS. 9, 10 and 11 show in detail the structure of the curved awning support arm 194. The awning support arm 194 has an inner member 224 pivotally attached to the first bracket 22 on its lower end and an outer member 226 comprising the remainder of the arm. The outer arm 226 is straight on its lower end portion and curved as shown on its upper end portion 228 so as to match or correspond to the curvature of the travel trailer or supporting surface when in the collapsed storaged position as shown in FIG. 9. The lower end straight portion of the awning support arm outer member 226 encloses the support arm inner member 224. The awning roller 16 is attached to the uppermost end of the support arm outer member 228 by a top plug member 229 inserted within the cavity of the interior of the member 226. A locking screw 230 is provided in the lower end portion of the support arm 226 as shown for locking the support arm 194 in a fixed length position. On the upper curved end portion 228 of the outer arm member 226, a lug 232 is provided. This lug 232 is for the purpose of engaging with the end of the brace end member 148 to fix the position thereof relative to the support arm when the awning structure 12 is in the extended position. FIG. 11 shows the awning structure in the substantially extended position with the lug 232 adjacent to the brace end 155. The support arm inner member 224 has a lug 234 on the lower end thereof as shown which is a support for the outer arm member 226 when in the collapsed storaged position as shown in FIG. 9. The lug 234 functions as a downward motion limit stop for the outer member 226 on the inner member 224.

The awning structure and brackets 12 of this embodiment of this invention are used in the same manner as hereinbefore described and are attached to a trailer or other structure in a similar fashion. The awning rail 180 must be positioned on the side of the trailer on the curved surface thereof substantially above the door opening as shown in FIGS. 9, 10 and 11 so the awning sheet 14 will clear the door when it is opened. FIG. 16 shows in detail the position of the awning roller 16 at the awning rail 180 when in the retracted position. In this retracted position the awning roller 16 is adjacent to the awning railer 180 with the brace 20 and awning support arm 194 in the juxtapositional position as generally shown in FIG. 9. When in the storage position the brace 20 is held in position against the trailer by its being extended having the lower end thereof in contact with the notch portion 52 of the first bracket 22. The awning support arm 194 is held in the fixed position shown in FIG. 9 by having the support arm's outer members 226 pulled down so the lug 144 of the roller 16 is in firm contact with the awning rail 180 as shown in FIG. 16 and further the locking screw 230 is tightened to rigidly connnect the inner member 224 with the other member 226. The roller 16 is prevented from turning by a lug 144 in contact with rail 180, in turn preventing awning sheet 14 from billowing in the air through which the trailer is moved.

In the manufacture of the awning and brackets of this invention, it is seen that same can be produced by a new extrusion method and joined together in the shown forms of the embodiments thereof to achieve the end products. The particular extrusion method disclosed herein is disclosed with the manufacture of the shown awning brackets and is unique in the formation of the notch-like aperture in the portions of the brackets used for mounting the braces and support arms. In the practice of the invention the extrusion method has been found to be the most practical and economical process of manufacturing the awning brackets. Additionally, the use of extrusions in forming the brace and the support arm portions of the awning structures has also been found to be advantageous due to the necessary interlocking construction of the members.

In the use and operation of the awning structures, brackets and extrusion method therefor of this invention, it is seen that same provides a simply operated, easily mountable and easily operable awning structure which can be used with travel trailers and similar structures. The awning structures of this invention are adapted to be lockable in the retracted collapsed storage position adjacent the supporting surface and easily extendable therefrom. When the awning structures are in the locked storage position their use with a travel trailer will not be disturbed by wind forces encountered when pulling the trailer on the road. In the practice of the therein described extrusion method of forming the brackets, it is obvious that the new method provides a simple manner of making the brackets as it requires only cutting of the extrusions and assembling the brackets. As disclosed, the awning structure of this invention in one embodiment is for use with travel trailers having straight or planar sides and in another embodiment is for other travel trailers having a curved side.

As is apparent from the foregoing description of applicant's awnings, brackets, and extrusion method therefor, a simple and inexpensive method has been provided to produce brackets for the awning structures. The brackets themselves are economical and simple to produce by using the herein described new extrusion method of making them. The awning structure is a unit light in weight, simple to use, economical to manufacture and provides an awning support structure that rolls up the awning sheet in a condition that will permit use of the awnings with travel trailers which are pulled on the road extensively. The awning structures are constructed so they will lock in a storage position adjacent to the supporting surface on which the awning structure is mounted thereby protecting the rolled awning sheet and securing the supporting structure.

While the invention has been described in conjunction with preferred specific embodiments thereof, it

I claim:

1. An awning structure, comprising:
   a. an awning sheet securable on one edge to a supporting surface,
   b. a roll means secured to said awning sheet along an edge thereof,
   c. a roll means support arm having said roll means mounted on the upper end thereof,
   d. a first bracket mountable on said supporting surface and pivotally mounting the lower end of said support arm,
   e. a second bracket mountable on said supporting surface,
   f. a brace member pivotally secured on one end to said second bracket,
   g. said brace member having a free end operably securable to the upper end of said support arm when in an extended position, and
   h. said first bracket having means to receive and hold in juxtapositional relation both said brace member and said arm member with said free end of said brace member in contact with said first bracket when said awning structure is in a retracted storage position.

2. An awning structure, comprising:
   a. an awning sheet securable on one edge to a supporting surface,
   b. an awning sheet roll means secured to said awning sheet along an edge thereof,
   c. a roll means support arm having said roll means mounted on the upper end thereof,
   d. a first bracket mountable on said supporting surface and pivotally mounting the lower end of said support arm,
   e. a second bracket mountable on said supporting surface, and
   f. a brace member pivotally secured on one end to said second bracket,
   g. said brace member having a free end operably securable to the upper end of said support arm when in an extended position, and
   h. said first bracket having notch-like means to receive the lower end of said brace member, said first bracket being adapted to receive and hold in juxtapositional relation said brace member and said arm member with said free end of said brace member in said notch-like means when said awning structure is in a retracted storage position.

3. The awning structure of claim 1, wherein:
   a. said first bracket has a mounting member and an attached extended member, said mounting member being mountable on said supporting surface,
   b. said first bracket extended member has a notch-like aperture therethrough constructed and adapted to receive and hold a pin or the like.

4. The awning structure of claim 3, wherein:
   a. said first bracket extended member has a first side portion attached to said mounting member and a second side portion containing said notch-like aperture,
   b. said notch portion is formed between an upwardly inclined portion and an upright portion, and
   c. said notch-like aperture has an inner portion in the interior of said first bracket extended member and an outer portion connecting said inner portion with the surface of said second side portion, said inner portion being larger than said outer portion, said outer portion being divergent.

5. The awning structure of claim 1, wherein:
   a. said second bracket has a mount portion mountable on said supporting surface and an extended portion, and
   b. said second bracket extended portion has a notch-like aperture therethrough constructed and adapted to receive and hold a pin or the like.

6. The awning structure of claim 5, wherein:
   a. said notch-like aperture has an inner portion in an interior portion of said second bracket extended portion and an outer portion connecting said inner portion with the surface of said second bracket extended portion, said inner portion being larger than said outer portion.

7. The awning structure of claim 1, wherein:
   a. said second bracket has a mount member and an attached extended member, said mount member being mountable on said supporting surface,
   b. said second bracket extended member has a notch-like aperture therethrough constructed and adapted to receive and hold a pin or the like, and
   c. said second bracket extended member has a notch portion on the normally upper surface thereof constructed and adapted to receive and hold the upper end portion of said roll means support arm.

8. The awning structure of claim 7, wherein:
   a. said second bracket extended member has a first side portion attached to said mount member and a second side portion containing therein said notch-like aperture,
   b. said notch-like aperture has an inner portion in the interior of said second bracket extended member and an outer portion connecting said inner portion with the surface of said second side portion, said inner portion being larger than said outer portion, said outer portion being divergent.

9. The awning structure of Claim 1, wherein:
   a. said support arm and said brace member are telescopic and have means to temporarily join same to fix the length thereof,
   b. said first bracket having a mounting member and an attached extended member, said mounting member being mountable on said supporting surface, said extended member having a notch-like aperture therethrough constructed and adapted to receive and hold a pin or the like, said means to receive and hold in juxtaposition being a notch in the upper surface of said first bracket, said first bracket extended member having a first side portion attached to said mounting member and a second side portion containing said notch-like aperture, said notch portion being formed between an upwardly inclined portion and an upright portion, and said notch-like aperture having an inner portion in the interior of said first bracket extended member and an outer portion connecting said inner portion with the surface of said second side portion, said inner portion being larger than said outer portion, and said outer portion being divergent,
   c. said second bracket having a mount portion mountable on said supporting surface and an extended portion, said second bracket extended portion having a notch-like aperture therethrough constructed and adapted to receive and hold a pin or the like, said notch like aperture in the second bracket having an inner portion in an interior portion of said second bracket extended portion and an outer portion connecting said inner portion with the surface of said second bracket extended portion, said inner portion being larger than said outer portion.

10. The awning structure of claim 9, wherein:
a. said support arm is curved in the upper end portion thereof,
b. said second bracket is mountable on said supporting surface at a point between the ends of said support arm,
c. said support arm has a pair of channel-like members with an outer channel member and a slidable enclosed member, said slidably enclosed member being attached said first bracket and said outer channel member being attached to said awning sheet roll means, and
d. said brace member has a channel member and a slidably enclosed member, said brace enclosed member being attached to said second bracket, said brace channel member and said slidably enclosed member in said storage position being positionable in said support arm enclosed member.

11. The awning structure of claim 1, wherein:
a. said support arm and said brace member are telescopic and have means to temporarily join same for fixing the length thereof,
b. said first bracket having a mounting member and an attached extended member, said mounting member being mountable on said supporting surface, said first bracket extended member having a notch-like aperture therethrough constructed and adapted to receive and hold a pin or the like, said means to receive and hold in juxtaposition being a notch portion in the upper surface of said first bracket, said first bracket extended member having a first side portion attached to said mounting member and a second side portion containing said notch-like aperture, said notch portion being formed by an upwardly inclined portion and an upright portion, and said notch-like aperture having an inner portion in the interior of said first bracket extended member and an outer portion connecting said inner portion with the surface of the second side portion, said inner portion being larger than said outer portion, and said outer portion being divergent,
c. said second bracket having a mount member and an attached extended member, said mount member being mountable on said supporting surface, said second bracket extended member having a notch-like aperture therethrough constructed and adapted to receive and hold a pin or the like, and said second bracket extended member having a notch portion on the normally upper surface thereof constructed and adapted to receive and hold the upper end portion of said roll means support arm, said second bracket to extended member having a first side portion attached to said mount member and a second side portion containing therein said notch-like aperture, said notch-like aperture in the second bracket having an inner portion in the interior of said bracket extended member and an outer portion connecting said inner portion with the surface of the second side portion, said inner portion being larger than said outer portion, and said outer portion being divergent.

12. The awning structure of claim 11, wherein:
a. said support arm is straight,
b. said support arm has a pair of channel-like members with an outer channel member and a slidable enclosed member, said slidably enclosed member being attached to said first bracket and said outer channel member being attached to said awning sheet roll means, and
c. said brace member has a channel member and a slidable enclosed brace member, said enclosed brace member being attached to said second bracket, said brace channel member being attached to said second bracket, said brace channel member and said slidably enclosed brace member in said storaged postion being positionable in said support arm member.

13. The awning structure of claim 1 wherein said roll means has a lug extending substantially radially from one end portion thereof so as to contact said second bracket upon rotation of said roll means when said awning structure is in a collapsed condition to prevent rotation of said roll means and prevent billowing of said awning sheet.

14. The awning structure of claim 13, wherein there is a plurality of lugs spaced around said roll means.

15. The awning structure of claim 1, wherein there is a rail means mountable on said supporting surface, and said one edge of said awning sheet is securable thereto.

16. The awning structure of claim 15 wherein said roll means has a lug extending substantially radially from one end portion thereof so as to contact said rail means upon rotation of said roll means when said awning structure is in a collapsed condition to prevent rotation of said roll and billowing of said awning sheet.

17. The awning structure of claim 16, wherein there is a plurality of lugs spaced around said roll means.

* * * * *

UNITED STATES PATENT OFFICE
CERTIFICATE OF CORRECTION

Patent No. 3,918,511　　　　　　　　Dated November 11, 1975

Inventor(s) Albert E. Upton, Jr.

It is certified that error appears in the above-identified patent and that said Letters Patent are hereby corrected as shown below:

Column 1, line 31, delete "structure" and insert --structural--;

line 45, after "an" (first occurrence) delete "in";

Column 2, line 3, after "another" insert --embodiment--;

after "invention" delete "embodiment";

line 65, after "objects" delete the comma (,) and insert --and--;

Column 7, line 42, after "to" (first occurrence) insert --be--;

after "pivotally" delete "be";

Column 9, line 15, after "of" delete "this" and insert --the--;

Column 10, line 48, after "as" insert --is--.

Signed and Sealed this

Twenty-seventh Day of July 1976

[SEAL]

Attest:

RUTH C. MASON
Attesting Officer

C. MARSHALL DANN
Commissioner of Patents and Trademarks